(12) United States Patent
Hussain

(10) Patent No.: US 8,991,033 B1
(45) Date of Patent: Mar. 31, 2015

(54) METHODS FOR PRODUCING A SOCCER BALL

(71) Applicant: Ali Hasnain Hussain, Sialkot (PK)

(72) Inventor: Ali Hasnain Hussain, Sialkot (PK)

(*) Notice: Subject to any disclaimer, the term of this patent is extended or adjusted under 35 U.S.C. 154(b) by 0 days.

(21) Appl. No.: 14/516,475

(22) Filed: Oct. 16, 2014

(51) Int. Cl.
| | |
|---|---|
| *B29D 22/04* | (2006.01) |
| *A63B 41/02* | (2006.01) |
| *A63B 45/02* | (2006.01) |
| *A63B 41/08* | (2006.01) |
| *B29D 22/02* | (2006.01) |

(52) U.S. Cl.
CPC ............... *A63B 45/02* (2013.01); *A63B 41/08* (2013.01); *B29D 22/04* (2013.01); *B29D 22/02* (2013.01); *A63B 2243/0025* (2013.01)
USPC ............................................. 29/527.1

(58) Field of Classification Search
CPC ...... A63B 41/085; A63B 41/04; A63B 41/10; A63B 45/02; A63B 2243/0025; A63B 41/02; A63B 41/08; B29D 22/04; Y10T 29/49826
See application file for complete search history.

(56) References Cited

U.S. PATENT DOCUMENTS

| | | | | |
|---|---|---|---|---|
| 6,039,662 | A | * | 3/2000 | Chan .............................. 473/604 |
| 2003/0228946 | A1 | * | 12/2003 | Chan .............................. 473/604 |
| 2011/0253292 | A1 | * | 10/2011 | Chen ................................ 156/93 |

FOREIGN PATENT DOCUMENTS

| | | | | |
|---|---|---|---|---|
| DE | 4408047 | A1 * | 9/1995 | ............. A63B 41/08 |
| WO | WO 2010133305 | A1 * | 11/2010 | ............. A63B 45/00 |
| WO | WO 2013148947 | A2 * | 10/2013 | ............. A63B 41/04 |

* cited by examiner

*Primary Examiner* — Jermie Cozart
(74) *Attorney, Agent, or Firm* — Haris Zaheer Bajwa

(57) ABSTRACT

A sports ball having a high-performance cover formed from a plurality of embossed panels. The panels embossed at 2-3 mm from the edges of each of the panels. High tension stitching applied at the embossed regions for formulating a high performance soccer ball.

11 Claims, 14 Drawing Sheets

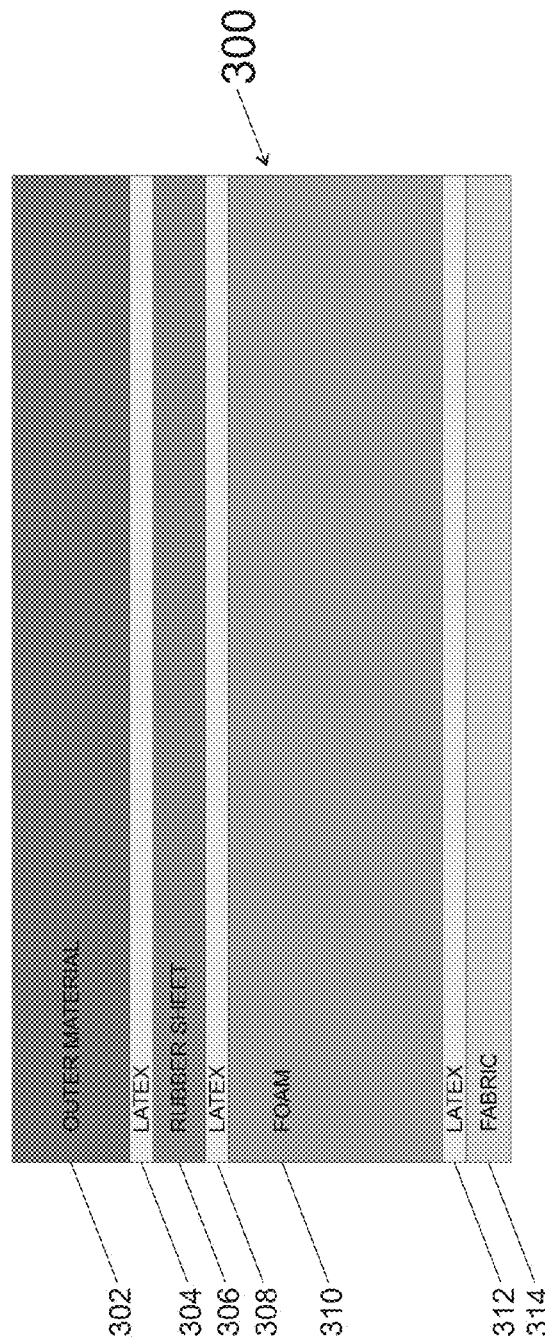

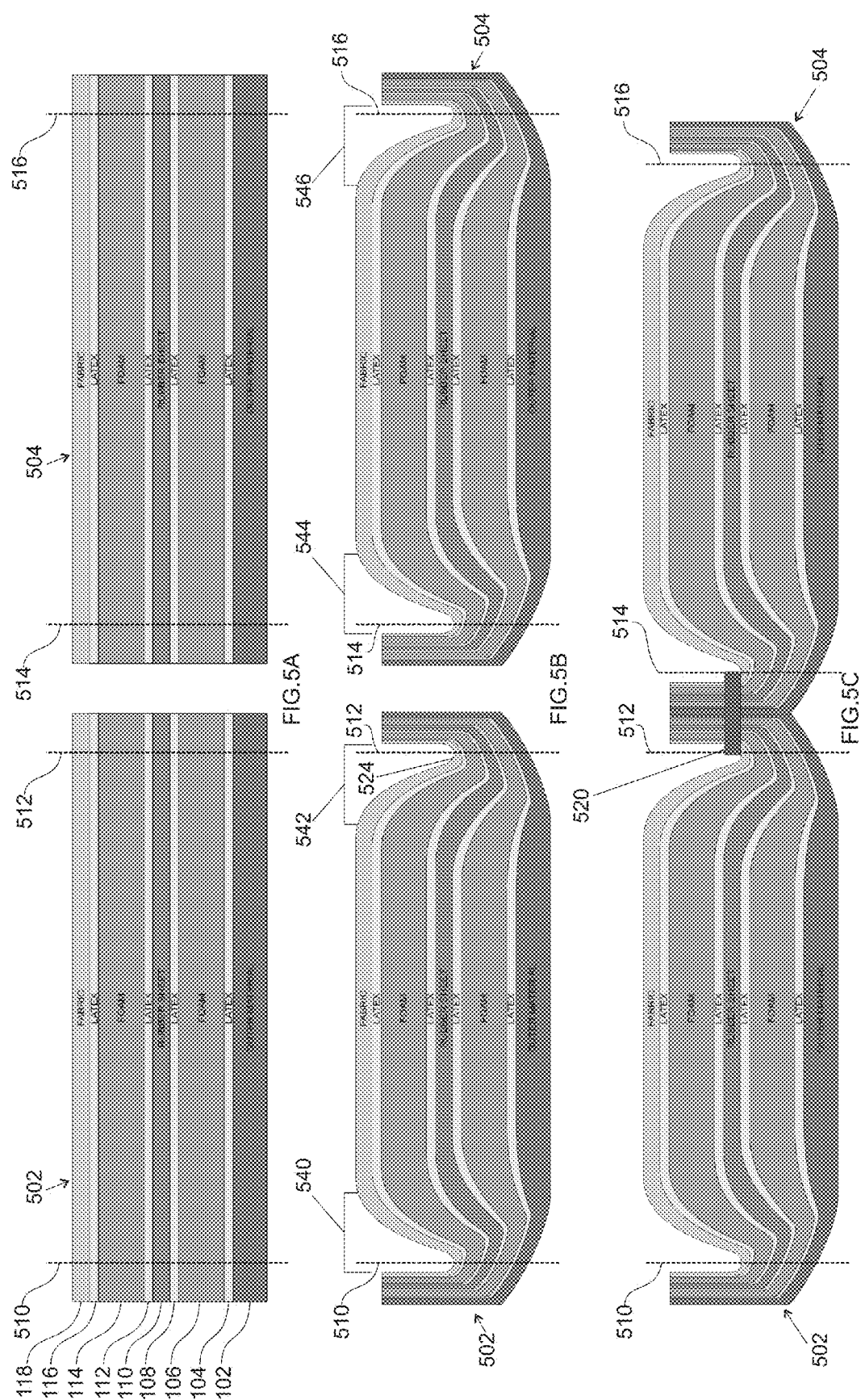

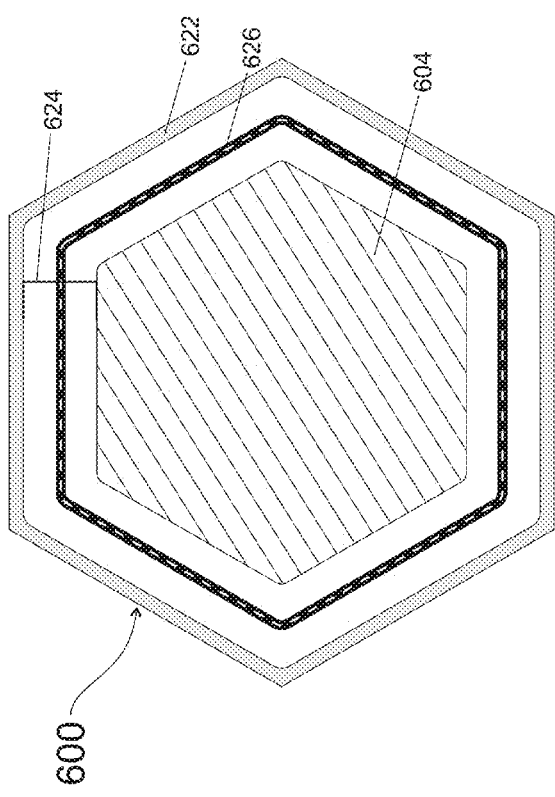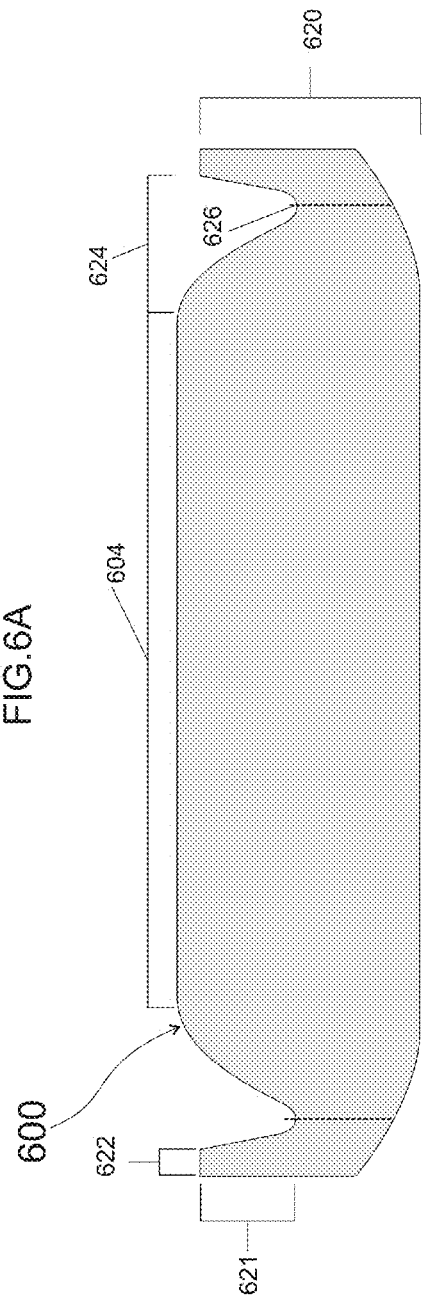

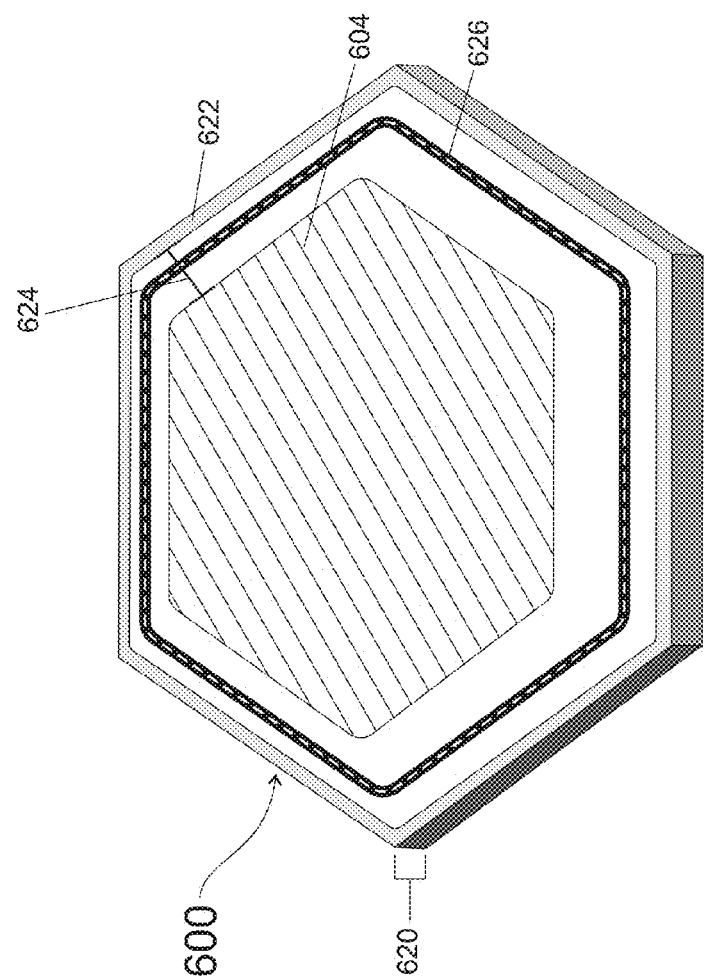

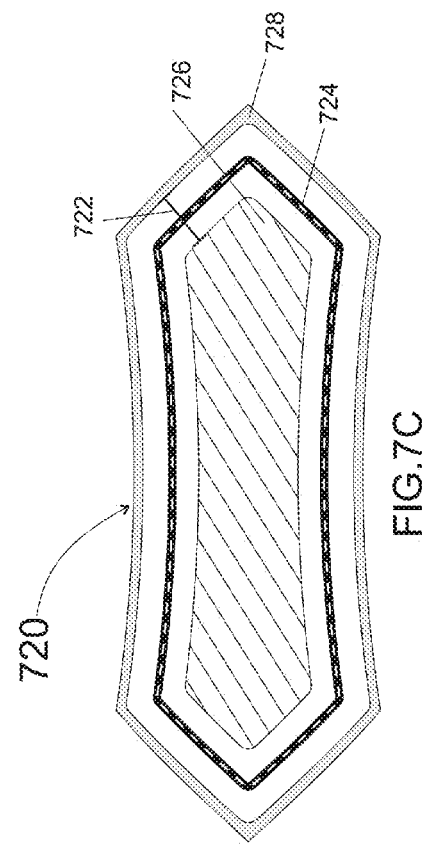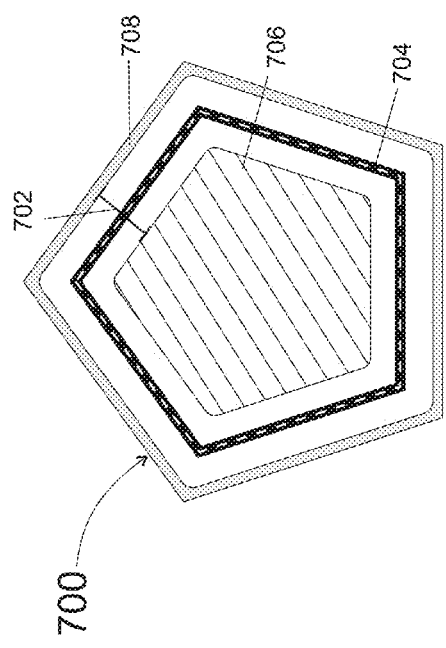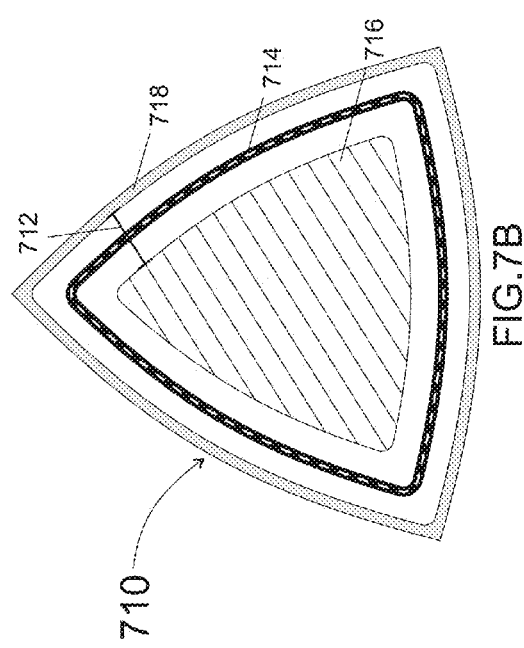

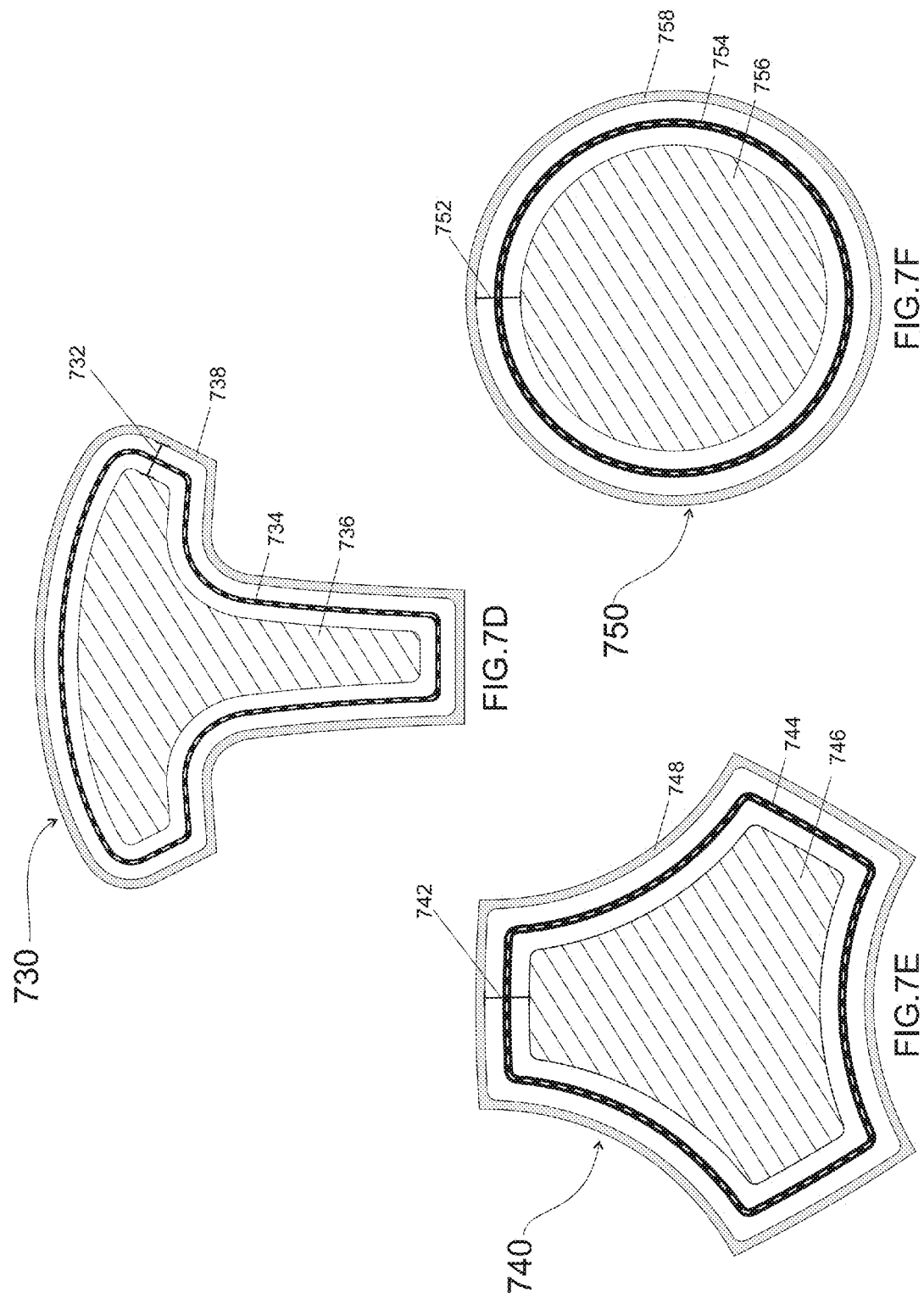

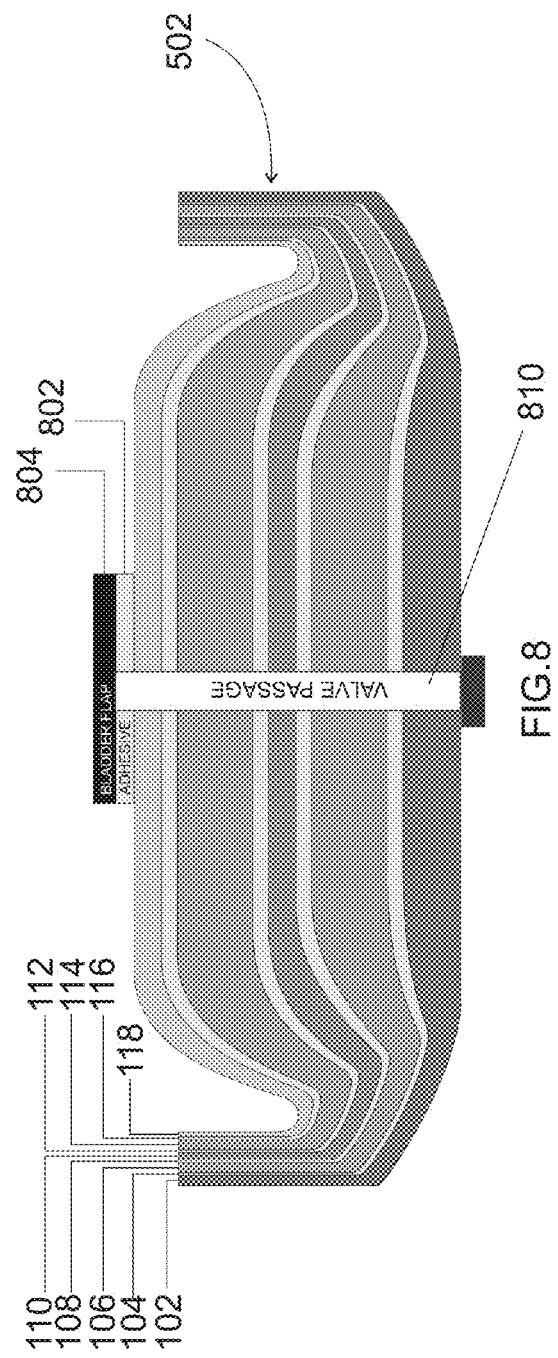

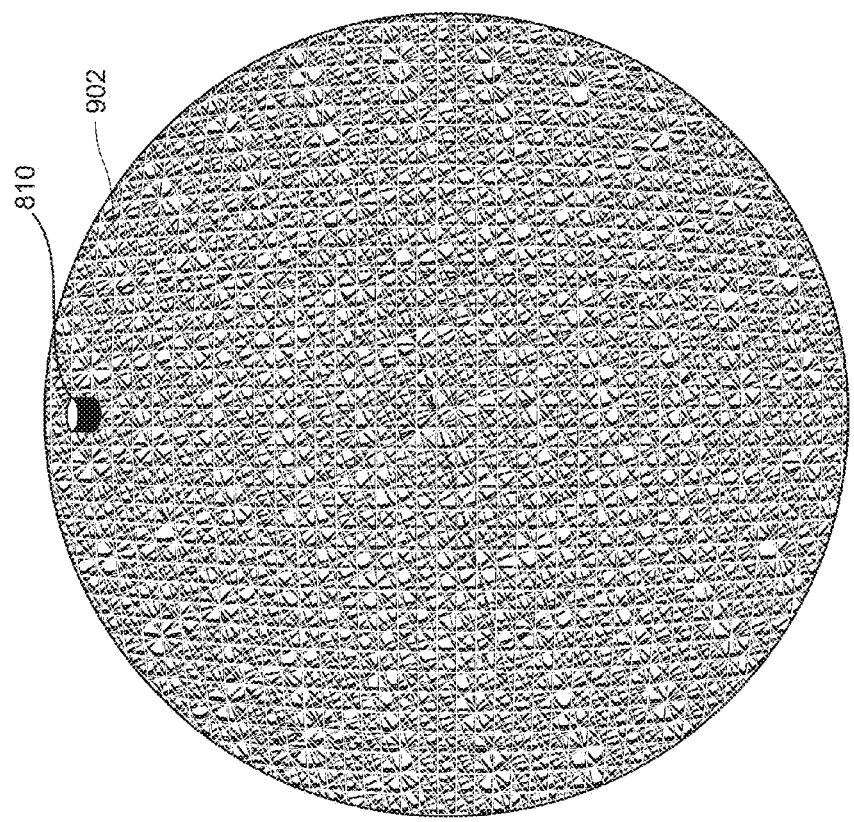
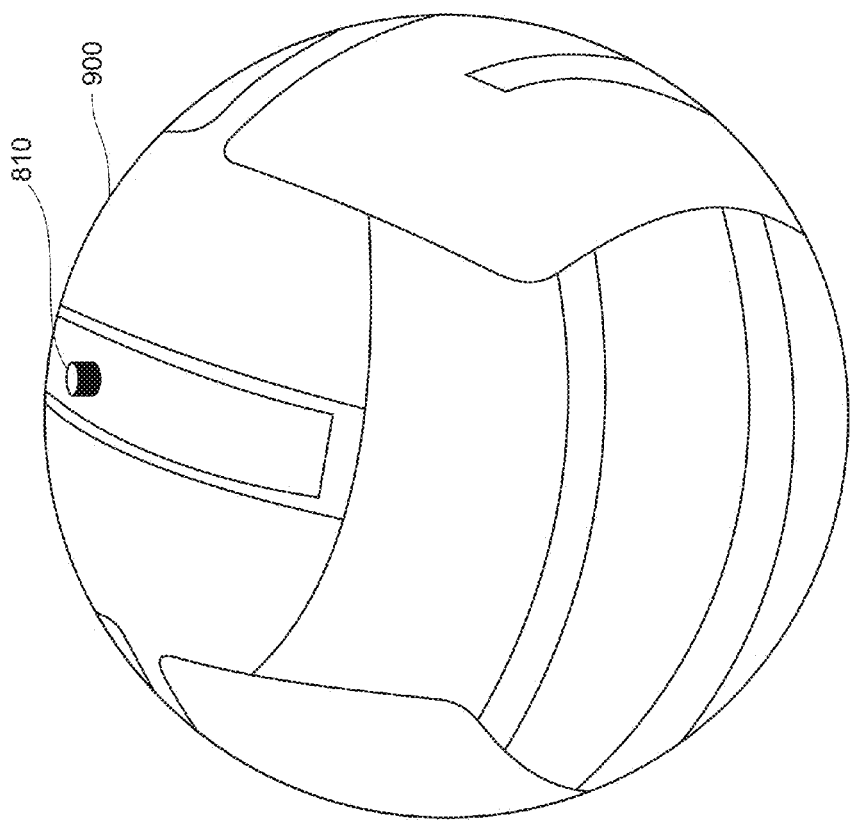

METHODS FOR PRODUCING A SOCCER BALL

TECHNICAL FIELD

The present disclosure relates generally to a ball and a method for manufacturing a ball. More particularly, and without limitation, the present disclosure relates to structures and methods for manufacturing a sports ball.

BACKGROUND

Conventional hand stitched and thermo bonded soccer balls have numerous drawbacks related to costs and performance. For example, the labor for hand-stitching balls is expensive since manufacturing a hand-stitched soccer ball may take two to four days. These balls also use a large amount of materials including three or more layers of cloth and a large amount of latex adhesive. Additionally, in hand stitched balls, the stitches are exposed on the surface of the ball. The exposure of the stitches on the surface leads to quicker abrasion of a manufactured ball.

On the other hand, thermo bonded soccer balls do not contain stitches that may be exposed on the outer surface, thermo bonded soccer balls have high transportation costs associated with them since they may not be deflated. For example, 7,500 deflated soccer balls may be packed in a twenty foot container, while only 2,500-3,000 thermo bonded soccer balls may be transported in the same container-leading to significantly higher transportation costs. Exemplary embodiments, consistent with the present disclosure, therefore aim to resolve the aforementioned problems, among others.

SUMMARY

An object of the invention is to provide a new and improved soccer ball having a high performance, robust shape, and durability. In an exemplary embodiment, a soccer ball includes a bladder and a plurality of panels stitched together at stitch lines at an embossed portion of each of the plurality of panels, the stitch lines 2-3 mm from respective edges of each of the plurality of panels.

In an exemplary embodiment, a manufacturing method of a soccer ball is provided. Exemplary methods include cutting out a plurality of panels from a sheet of padding, determining stitch lines for each of the plurality of panels, applying heat and pressure at the stitch lines for embossing the plurality of panels. The method further includes creating a bladder valve panel by inserting a valve attached to a bladder in the middle of one of the plurality of panels, stitching at least a few of the plurality of panels using machine stitching at the stitch lines, inverting the soccer ball inside out so that the bladder is contained within the soccer ball, hand stitching any remaining unstitched stitch lines, and inserting air in the bladder and molding the soccer ball by applying heat and external pressure to the soccer ball and internal pressure due to the air in the soccer ball.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

FIGS. 1-3 show cross-section of exemplary paddings used for covers of a soccer ball, consistent with exemplary embodiments of the present disclosure;

FIGS. 5A-C illustrate an exemplary scenario for stitching two panels together, consistent with exemplary embodiments of the present disclosure;

FIGS. 6A-C are different views of a panel, consistent with exemplary embodiments of the present disclosure;

FIGS. 7A-7J illustrate various shapes of panels, consistent with exemplary embodiments of the present disclosure;

FIG. 8 illustrates an exemplary step for creating a bladder valve panel, consistent with exemplary embodiments of the present disclosure;

FIGS. 9A and 9B illustrate exemplary bladders, consistent with exemplary embodiments of the present disclosure;

DETAILED DESCRIPTION

A soccer ball is made up of two major components, a bladder and a cover of panels. Embodiments consistent with the present disclosure enhance the performance of a soccer ball by providing a method and structure for efficient stitching of panels. Specifically, exemplary embodiments provide for determining stitch lines where panels may be stitched together. Embossing or applying of heat and pressure may be used to create a depression or cavity for applying the stitching at the stitch lines. Therefore, embossing may allow for panels to be tightly stitched together providing a smooth surface exterior surface in a soccer ball where stitches may have minimal external exposure. When an air bladder included within a soccer ball is filled with air and a molding device applies pressure and heat on the outside surface, a soccer ball may be manufactured with uniformity and consistency in shape. Accordingly, soccer balls that are manufactured by using exemplary methods may have better performance and outer appearance than hand-stitched and thermo bonded balls.

Figure 1:
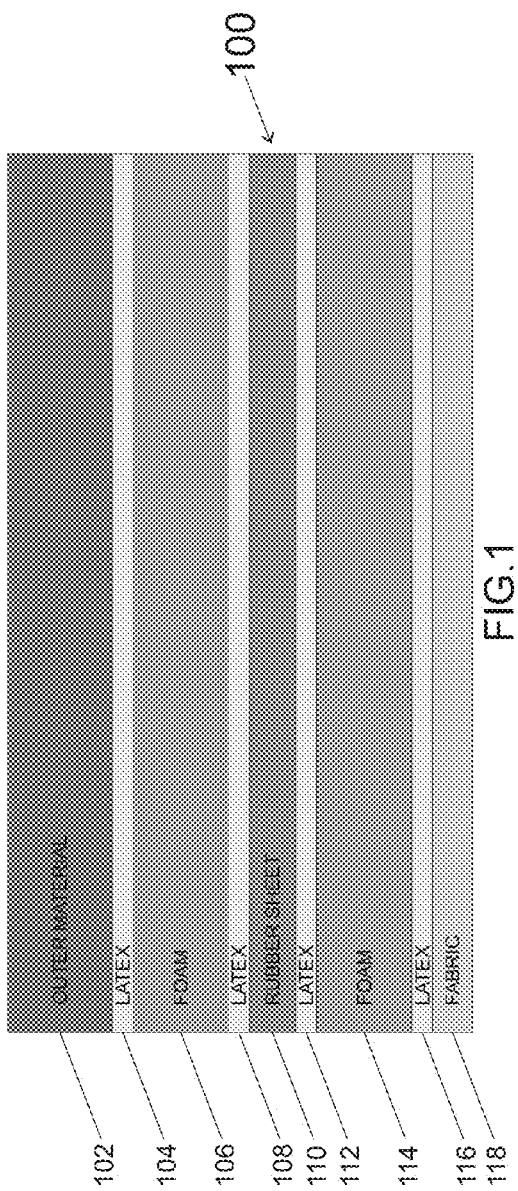

FIG. 1 shows a cross-section of materials comprising padding 100 for panels of a soccer ball, consistent with exemplary embodiments of the present disclosure. Padding 100 may include an outer material sheet 102 which may be a layer of Polyvinyl Chloride (PVC), Polyurethane (PU), or a similar synthetic material. Outer material sheet 102 may be laminated to a first layer of ethylene propylene diene monomer (EPDM) compound foam 106. The lamination may be completed using an adhesive 104, such as a latex adhesive. Padding 100 may further consist of rubber sheet 110, adhesive 112, EPDM foam 114, adhesive 116, and a thin layer of cloth or fabric 110. Adhesives 112 and 114 may be a latex adhesive. Furthermore, rubber sheet 110 may consist of natural rubber or latex sheet or synthetic rubber. In embodiments, outer material sheet 102 may have a thickness of 0.3-1.8 mm, foam 106 may have a thickness of 2-3 mm, EPDM foam 114 may have a thickness of 2 mm-3 mm rubber sheet 110 may have a thickness of 0.5-1.5 mm. In embodiments, total thickness of padding 100 may be 2-9 mm. In embodiments, padding 100 may be heated and dried for a pre-determined period. For example, padding 100 may be dried at 55 degrees Celsius for up to one hour or more.

Figure 2:
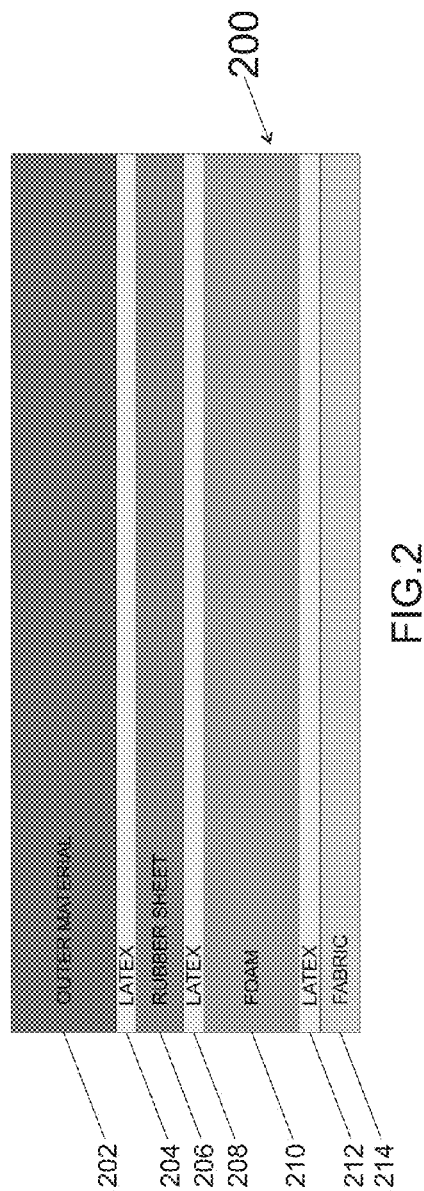

FIG. 2 shows a cross-section of materials comprising another padding 200 for panels of a soccer ball, consistent with exemplary embodiments of the present disclosure. Padding 200 may include an outer material sheet 202, similar to outer material sheet 102. Outer material sheet 102 may be laminated along with rubber sheet 206, EPDM foam 210, and fabric 214 using adhesives 204, 208, and 212, such as latex adhesives. In embodiments, rubber sheet 206, EPDM foam 210, and fabric 214 are respectively of the same materials as rubber sheet 110, EPDM foam 106/114, and fabric 118. However, in padding 200, outer material sheet 202 may have a thickness of 0.3-1.8 mm rubber sheet 306 may have a thickness of 0.5-1.5 mm, EPDM foam 210 may have a thickness of 2-4 mm and fabric 214 may have a thickness of 0.5-1.5 mm. In embodiments, total thickness of padding 200 may be 2-9 mm. In embodiments, padding 200 may be heated and dried for a pre-determined period. For example, padding 200 may be dried at 55 degrees Celsius for up to one hour or more.

FIG. 3 shows a cross-section of materials comprising another padding 300 for panels of a soccer ball, consistent with exemplary embodiments of the present disclosure. Padding 300 may include an outer material sheet 302, similar to outer material sheets 102 and 202 0.3-1.8 mm. Outer material sheet 302 may be laminated along with rubber sheet 306, EPDM foam 310, and fabric 214 using adhesives 304, 308, and 312, such as latex adhesives. In embodiments, rubber sheet 306, EPDM foam 310, and fabric 314 are respectively of the same materials as rubber sheet 110, EPDM foam 106/114, and fabric 118. However, in padding 300, outer material sheet 302 may have a thickness of 0.3-1.8 mm, rubber sheet 306 may have a thickness of 0.5-1.5 mm, EPDM foam 210 may have a thickness of 4-6 mm, and fabric 314 may have a thickness of 0.5-1 mm. In embodiments, total thickness of padding 300 may be 2-9 mm. In embodiments, padding 300 may be heated and dried for a pre-determined period. For example, padding 300 may be dried at 55 degrees Celsius for up to one hour or more.

In embodiments, using various thicknesses of foams and variations in the order of materials in the padding may lead to different properties for a manufactured soccer ball. For example, a ball's bounce, softness, or hardness may be impacted. These properties may impact a ball's rebound and/or touch characteristics.

Figure 4A:
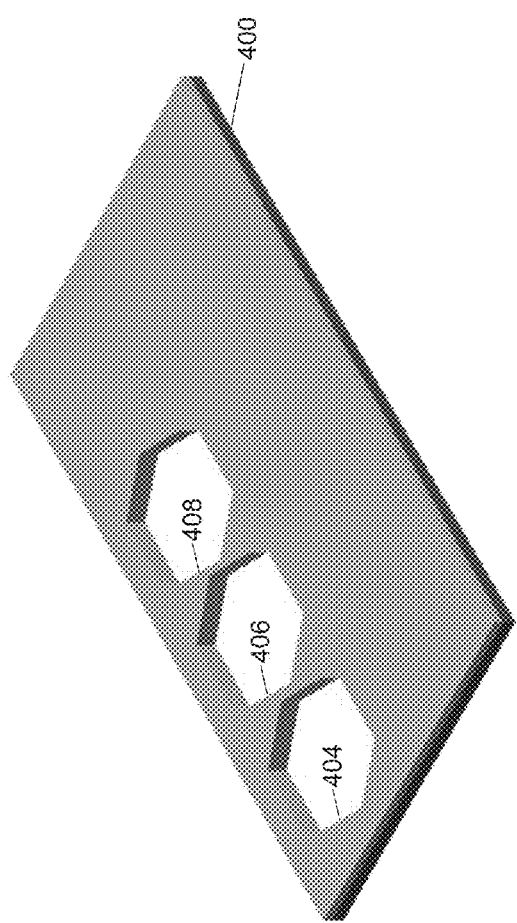
FIGS. 4A and 4B are illustrations of an exemplary scenario for cutting out panel shapes, consistent with exemplary embodiments of the present disclosure.
Figure 4B:
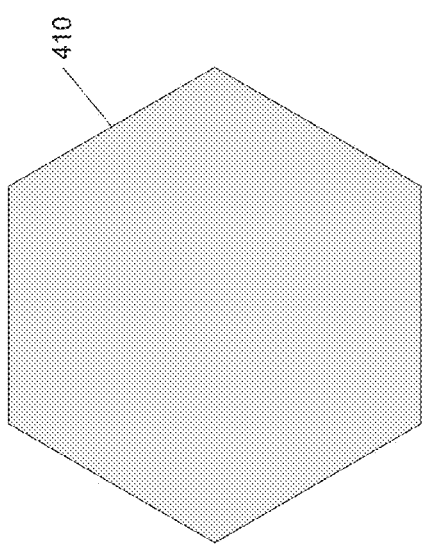

FIGS. 4A and 4B are illustrations of an exemplary scenario for cutting out panel shapes, according to an embodiment of the present disclosure. Layer 400 may represent either paddings 100, 200, or 300. As shown in FIG. 4A, required panel shapes (404, 406, and 408) may be cut from layer 400 using conventional ball cutting knives. FIG. 4B illustrates an exemplary cutout 410 that may be cut from layer 400. Cutout 410 is hexagon shaped cutout of padding 400 to form a hexagon shaped panel.

FIG. 5A-5C are cross-sections of exemplary steps in the forming of panels of a soccer ball, consistent with embodiments of the present disclosure. One of ordinary skill in the art will comprehend, that the elements illustrated within FIGS. 5A-C are not drawn to scale. Instead, they have been illustrated in sizes that allow for easier comprehension. Additionally, while FIGS. 5A-5C show exemplary steps based on padding 100, similar steps may be applied to padding 200, 300, or any other suitable material that may be used for panels of a sports ball.

FIG. 5A illustrates two cutouts 502 and 504. In an exemplary embodiment, cutouts 502 and 504 may be cutouts from padding 100. As a first step, stitch lines 510, 512, 514, and 516 are determined. In an exemplary embodiment, stitch lines may be a pre-determined distance from the edges of the panels. One of ordinary skill in the art will comprehend that the distance of stitch lines 510, 512, 514, and 516 from the edges of cutouts 502 and 504 are not illustrated to scale but rather are illustrated relatively bigger for ease of understanding. Exemplary stitch lines 510, 512, 514, and 516 may be 2-3 mm from respective edges of cutouts 502 and 504. In additional embodiments, distance of stitch lines from the edges may be determined based on thickness of the padding. Each cutout of padding 100 may contain stitch lines where the various cutouts may be stitched to additional cutouts. Further details regarding stitch lines is provided further below accompanying the description of FIGS. 6A-C.

Accordingly, once stitch lines 510, 512, 514, and 516 are determined, heat and pressure from a source may be applied focusing on locations of stitch lines 510, 512, 514, and 516. In an exemplary embodiment, 65-95 degrees Celsius may be applied for up to 40-60 seconds. Therefore, an embossing machine (or any other source) may apply pressure and heat to stitching lines 510, 512, 514, and 516. In embodiments, an embossing machine or any device with heated plates may be used for creating channels or stitch regions, that is, depressions or cavities.

FIG. 5B illustrates stitch regions 540, 542, 544, and 546 that are created by application of heat and pressure at locations corresponding to stitch lines 510, 412, 514, and 516. Stitch regions may represent a cavity or depression created by the application of pressure and heat to respective cutouts 502 and 504. Specifically, within each stitch regions 540, 542, 544, and 546, at location corresponding with stitch lines 510, 412, 514, and 516, cutouts 502 and 504 have the minimal amount of thickness. Furthermore, due to embossing, the edges of cutouts 502 and 504 are turned up.

Accordingly, exemplary cutouts 502 and 504 are embossed due to molding under heat and pressure of the materials from the cutout of padding 100 and the application of the pressure. Thickness of panels 502 and 504 is reduced in stitching regions 540, 542, 544, and 546. Once cutouts 502 and 504 are cooled in this condition, they retain their shape with a depression or cavity in stitching regions 540, 542, 544, and 546.

FIG. 5C illustrates stitching 520 that is applied for stitching together cutouts 502 and 504. Stitching 520 may be applied to all stitch lines of a cutout for a first panel with cutouts for various other panels. For example, a hexagonal shaped cutout may be stitched together with six other cutouts, each of the six cutouts forming parts of six respective panels of a soccer ball. In embodiments, stitching material may be polyester or polyester cotton mix high strength thread applied by a stitching machine, such as a high tension stitching machine. A high tension stitching machine may apply very high tension on a thread enabling the stitches to be invisible on the outer shell of a manufactured soccer ball.

In embodiments, an aspect of the step illustrated in FIG. 5C is that stitching 520 is applied at respective stitch lines 512 and 514 with respective surfaces of outer material 102 of cutouts 502 and 504 being in contact with each other. Accordingly, after all panels are stitched together, any machine stitching may be contained within a soccer ball. Additionally, fabric layers (fabric 118) may also be contained within the ball, as is apparent by the additional description provided in the disclosure.

FIG. 6A-6C are different views of an embossed panel, according to an embodiment of the present disclosure. Exemplary panel 600 illustrates a singular panel as it may appear after the steps illustrated in FIGS. 6A-C have been applied to any cutout of paddings 100, 200, or 300. An aspect illustrated in FIGS. 6A-C is the difference in thickness at stitch lines as opposed to other regions of panel 600. For example, FIG. 6A illustrates a top view of panel 600 that includes stitch region 624, stitch line 626, top surface 604, and edge section 622. In embodiments, top surface 604 may refer to a part of the panel where no pressure or heating is applied for embossing, that is, top surface 604 has a thickness that is the same as the thickness of a respective cutout before embossing. Stitch line 626 may represent location of where panel 600 is stitched and where the pressure and/or heat is directly applied by an embossing machine or a similar device. Stitch region 624 may refer to all of the region where a cavity or depression may be created by the embossing process. Edge section 622 may represent a region where due to embossing, the edges may be turned up and/or thickness of the materials is reduced.

As illustrated in a cross-section of panel 600 illustrated in FIG. 6B, a depth 621 of Stitch region 624 may be more than half a thickness 620 of panel 600 at top surface 604. Accordingly, panel 600 may have a minimum thickness at allocation of stitch line 626. In exemplary embodiments, before embossing, a distance between determined stitch line 626 and respective edges of a cutout for panel 600 may be 2-3 mm.

FIG. 6C, illustrates a three-dimensional view of panel 600. In embodiments, the three-dimensional view of panel 600 provides a further perspective indicating the location of stitch line 626 within stitch region 624.

Figure 7G:
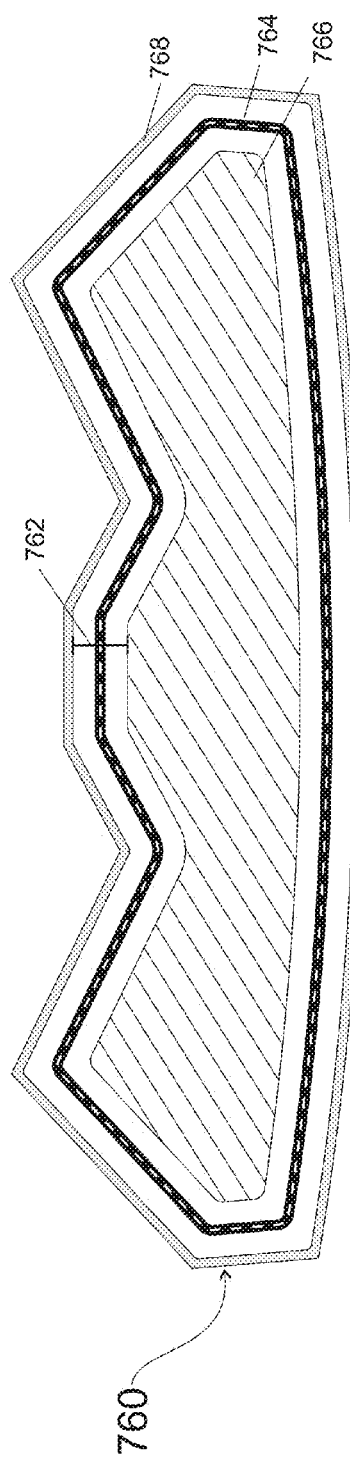
Figure 7H:
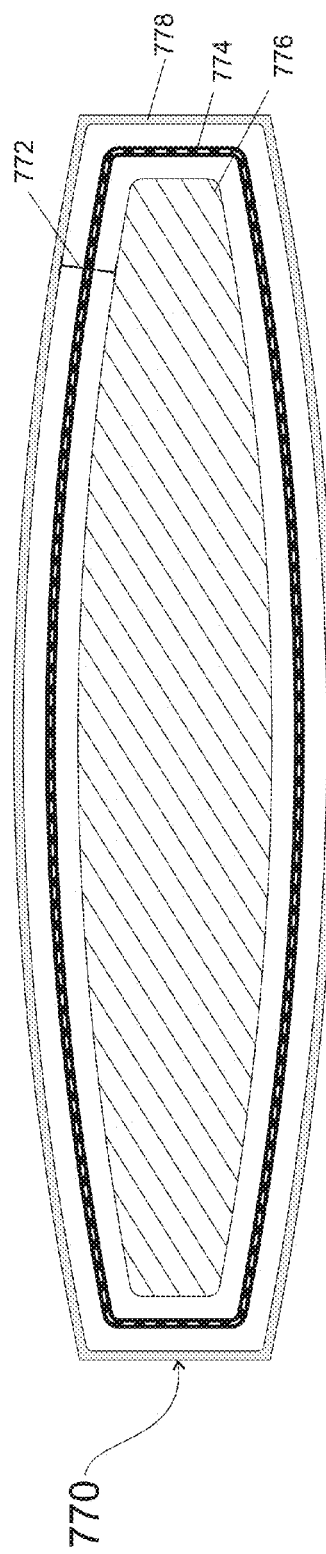
Figure 7I:
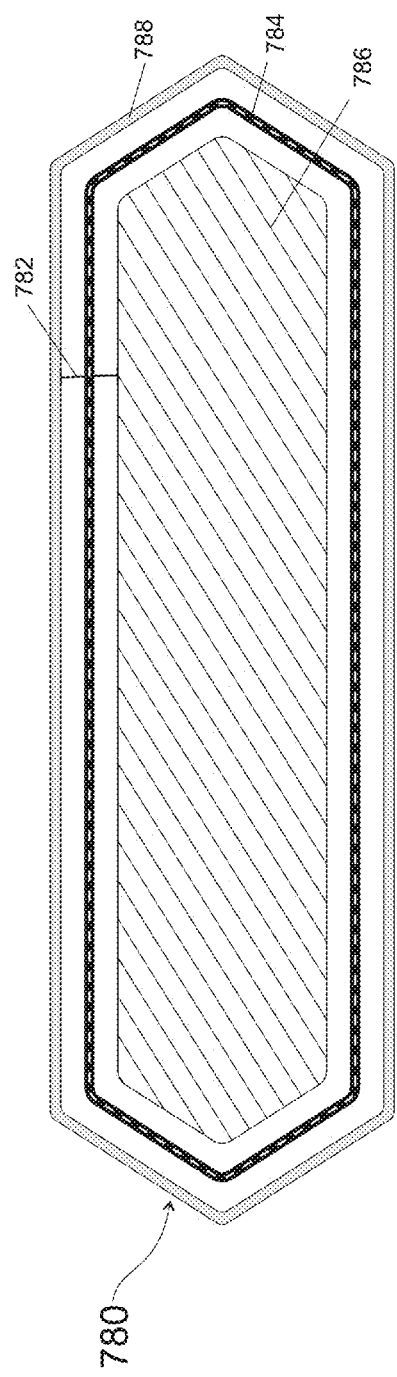
Figure 7J:
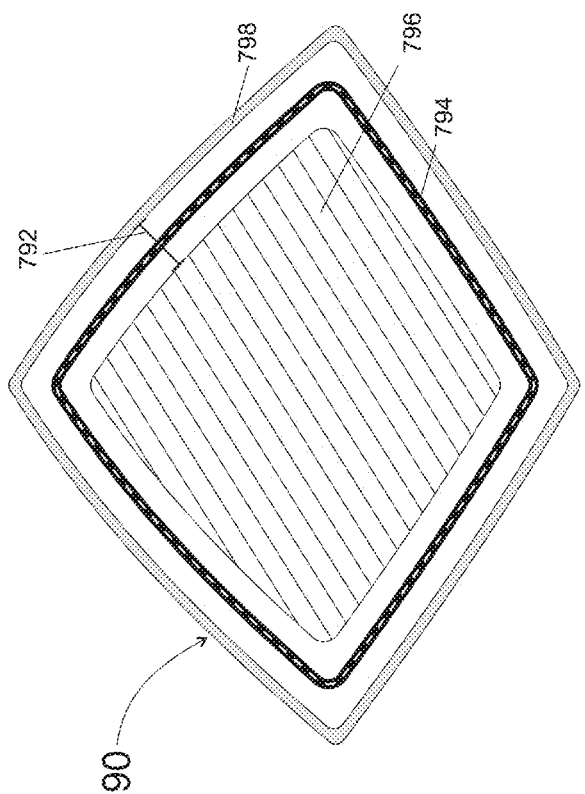

FIGS. 7A-7J illustrate various shapes of panels, consistent with exemplary embodiments of the present disclosure. FIG. 7A illustrates pentagon-shaped panel 700 comprising stitch region 702, stitch line 704, top surface 706, and edge section 708. Similarly, FIGS. 7B-7J, illustrate different shaped panels 710, 720, 730, 740, 750, 760, 770, 780, and 790, that each include respective stitch regions 712, 722, 732, 742, 752, 762, 772, 782, and 792, corresponding stitch lines 714, 6 724, 734, 744, 754, 764, 774, 784, and 794, top surfaces 716, 726, 736, 746, 756, 766, 776, 786, and 796, and edge sections 718, 728, 738, 748, 758, 768, 778, and 798. In embodiments, different shaped panels may be stitched to each other. For example, round-shaped panel 750 may be stitched panel 740.

FIG. 8 provides a cross-section of an exemplary bladder valve panel to further explain how the bladder valve panel is created, consistent with exemplary embodiments of the present disclosure. For example, a cavity or hole may be created in the middle of panel 502 through which valve 810 may be passed through. Furthermore, an adhesive 802, such as a latex adhesive, may be applied between bladder flap 804 and fabric layer 118 attaching bladder flap 804 to panel 502 creating an exemplary bladder valve panel. As explained in further detail along with the explanation of FIGS. 9A and 9B, bladder flap 804 may refer to a portion of an exemplary bladder that may be attached to a bladder valve panel. Adhesive 802 may be applied between bladder flap 804 and fabric layer 118 attaching bladder flap 802 to the bladder valve panel.

Figure 10B:
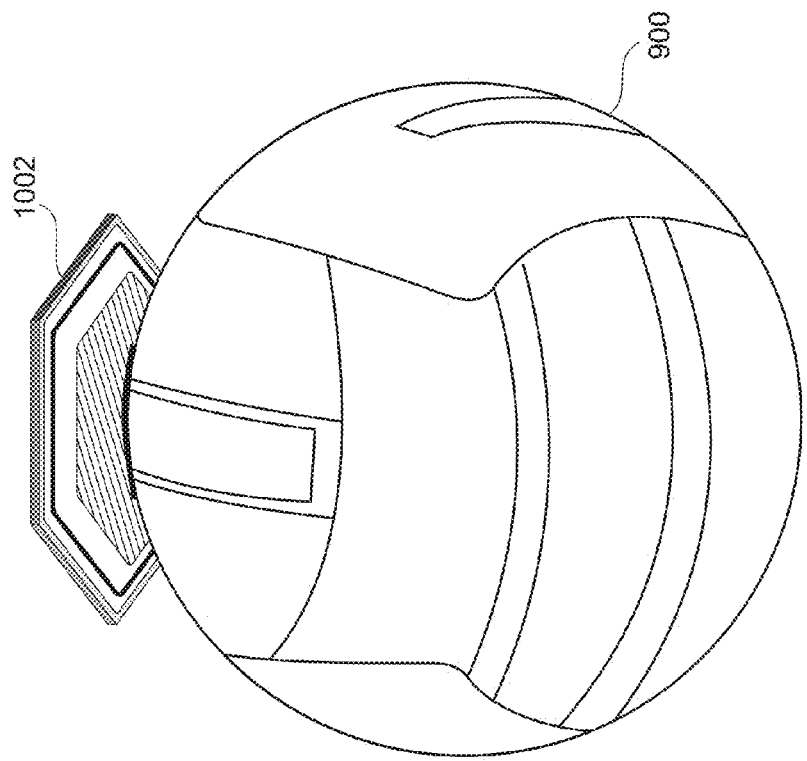
FIGS. 10A and 10B illustrate exemplary bladders attached to respective bladder valve panels, consistent with exemplary embodiments of the present disclosure.
Figure 10A:
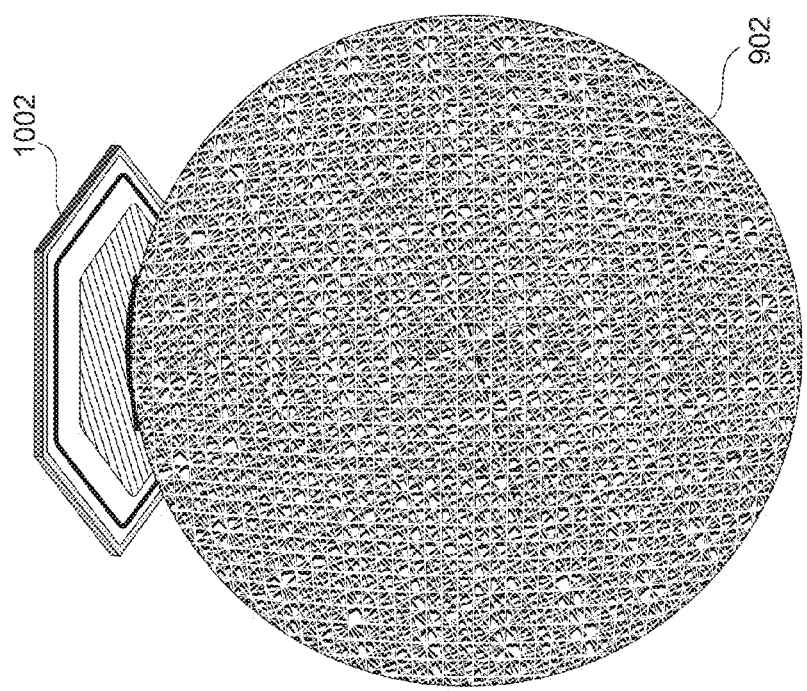

FIGS. 9A and 9B illustrate two exemplary bladders 900 and 902, consistent with exemplary embodiments of the present disclosure. Bladders 900 and 902 are both attached to exemplary valve 810. In embodiments, adhesive may be applied to portions of bladders 900 and 902 (bladder flap 804) surrounding valve 810 so that bladders 900 and 902 may be permanently attached to a bladder valve panel. Bladder 900 may be any molded rubber or butyl or synthetic rubber that may be wound with polyester or nylon threads. Bladder 902 may be a molded rubber or butyl bladder or synthetic rubber that may be laminated with polyester or polyester cotton cloth strips. In embodiments, additional bladders, with restricted circumference properties may be used. In exemplary embodiments, valve 810 may be used for inflating or deflating bladders 900 and 902. Exemplary bladders aid in providing firmness and roundness to a soccer ball. FIGS. 10A and 10B illustrate the two exemplary bladders 900 and 902, attached to exemplary bladder valve panel 1002. Bladder valve panel 1002 may be stitched together with additional panels formed using the method illustrated in 5A-C to form a soccer ball.

In exemplary embodiments, most of the panels are machine-stitched together, with the fabric layers 118 being exposed on the outside of the soccer ball when machine stitching is being applied. Then, the ball may be inverted inside out, where the bladder is contained within the soccer ball. Hand stitching may then be applied to any remaining un-stitched panel edges. In embodiments, only an amount of panels edges are left for hand stitching that are needed to invert a soccer ball inside out so that the bladder is contained within the stitched-together panels. In embodiments, a length of panel edges where hand-stitching may be applied is four to six inches.

Figure 11B:
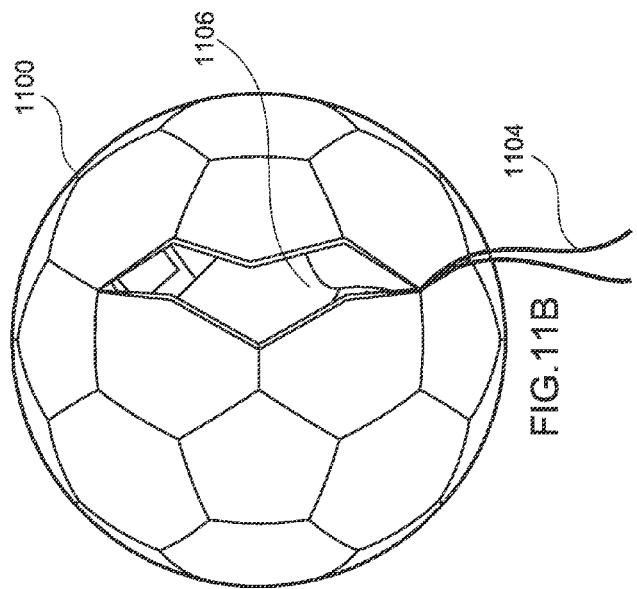
FIGS. 11A-C illustrate some exemplary steps for stitching panels of a soccer ball, consistent with exemplary embodiments of the present disclosure.
Figure 11C:
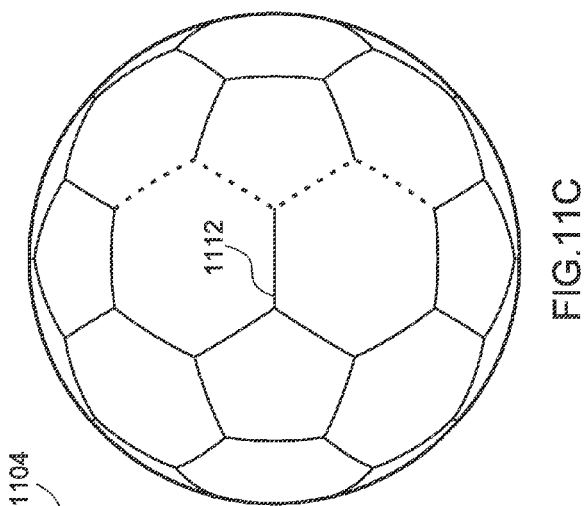
Figure 11A:
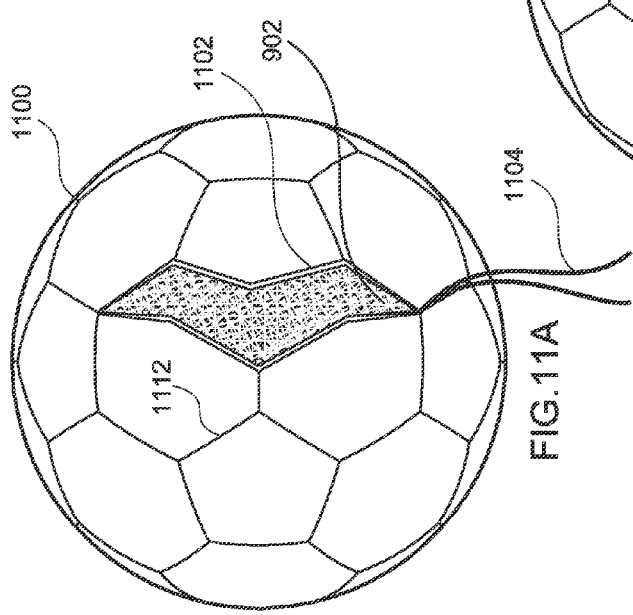

FIGS. 11A-C illustrate some exemplary steps for stitching panels of a soccer ball, consistent with exemplary embodiments of the present disclosure. FIG. 11A illustrates soccer ball 1100 with various panels. Numerous panels and/or panel edges of soccer ball 1200 are stitched together using machine stitching 1112 as discussed above with respect to FIGS. 5A-C. A cavity 1102 exposing bladder 902 may to be hand-stitched using string 1104. FIG. 11B illustrates a second stage of hand stitching where panels are pulled closer together and string 1104 may be being applied at exemplary position 1106. FIG. 11C illustrates a completed stitched soccer ball 1100 with majority of the panels and/or panel edges being stitched together by applying machine stitching 1112. Four panel edges are stitched together using hand stitching 1210.

In embodiments, once the machine and hand stitching is complete, a bladder contained within a soccer ball may be completely filled with air. Then, the soccer ball may be placed in a heated molding machine which is round in the finalized shape of a soccer ball. Heating under pressure of the inner cover of the molding machine may then be applied to the soccer ball for providing a permanent shape to the soccer ball. In some embodiments, the soccer ball may be molded at 70 degrees Celsius for thirty seconds to sixty seconds. Accordingly, a total of sixty second of heat of 70 degrees Celsius may be applied to the soccer ball. In embodiments, because of foam material included within padding, when heat and pressure are applied during molding, exemplary stitch regions, that is, cavities or depression are filled. Accordingly, the materials included within the padding extending to the stitching filing the cavities and providing the cover a robust round shape. Therefore, the ball sets uniformly from inside due to pressure by the bladder and from outside due to the pressure and/or heat applied by the mold.

In embodiments, any seams in a ball may be sealed by application of sealants before or after molding. Exemplary sealants may include polyurethane liquids among others.

In embodiments, exemplary soccer balls manufactured according to exemplary methods aid in reducing manufacturing costs significantly, while at the same time, the ball rebounds, has water resistance/absorption, and has abrasion properties that are superior to the characteristics of current hand stitched and thermo bonded balls. Furthermore, the ability to transport these balls while they are deflated also leads to numerous commercial advantages such as significant reduction of cost compared to transportation of thermo bonded balls.

In some embodiments, the exemplary methods of stitching together embossed panels may be applied in any types of balls that utilize panels and bladders, such as footballs, rugby balls, volleyballs, water polo balls, etc.

What is claimed:

1. A manufacturing method of a soccer ball, comprising the steps of:
 a. cutting out a plurality of panels from a sheet of padding;
 b. determining stitch lines for each of the plurality of panels;
 c. applying heat and pressure at the stitch lines for embossing the plurality of panels creating respective channels;
 d. creating a bladder valve panel by inserting a valve attached to a bladder in the middle of one of the plurality of panels;
 e. stitching at least a few of the plurality of panels using machine stitching at the stitch lines;
 f. inverting the soccer ball inside out so that the bladder is contained within the soccer ball;
 g. hand stitching any remaining unstitched stitch lines; and
 h. inserting air in the bladder and molding the soccer ball by applying heat and external pressure to the soccer ball and internal pressure due to the air in the soccer ball.

2. The method of claim 1, wherein creating respective channels comprises creating depressions at the stitch lines.

3. The method of claim 1, wherein molding the soccer ball by applying heat and external pressure to the soccer ball and internal pressure due to the air in the soccer ball comprises molding the soccer ball until ethylene propylene diene monomer (EPDM) foam included within the padding expands to fill the respective channels.

4. The method of claim 1, wherein the stitch lines are 2-3 mm from respective edges of the plurality of panels.

5. The method of claim 1, applying heat and pressure at the stitch lines for embossing the plurality of panels creating respective channels comprises applying heat and pressure using heated plates.

6. The method of claim 1, wherein the sheet of padding consists of ethylene propylene diene monomer (EPDM) foam, adhesives, and fabric.

7. The method of claim 1, wherein surfaces of all the panels in contact with the bladder are fabric.

8. The method of claim 1, wherein the hand stitching is applied for four to six inches.

9. The method of claim 1, wherein the soccer ball comprises of thirty-six panels.

10. The method of claim 1, wherein a maximum thickness of each of the plurality of panels is 6-9 mm and a stitch region thickness at the stitch lines is 2-3 mm.

11. A manufacturing method of a soccer ball, comprising the steps of:
 a. cutting out a plurality of panels from a sheet of padding;
 b. determining stitch lines for each of the plurality of panels;
 c. applying heat and pressure at the stitch lines for embossing the plurality of panels creating respective channels;
 d. creating a bladder valve panel by inserting a valve attached to a bladder in the middle of one of the plurality of panels;
 e. stitching at least a few of the plurality of panels using machine stitching at the stitch lines;
 f. inverting the soccer ball inside out so that the bladder is contained within the soccer ball;
 g. hand stitching any remaining unstitched stitch lines;
 h. inserting air in the bladder; and
 i. molding the soccer ball by applying heat and external pressure to the soccer ball and internal pressure due to the air in the soccer ball until ethylene propylene diene monomer (EPDM) foam included within the sheet of padding expands to fill the respective channels.

* * * * *